United States Patent [19]
Burke et al.

[11] 4,229,013
[45] Oct. 21, 1980

[54] SPRING SEAL

[75] Inventors: John A. Burke, Rocky River, Ohio; James B. Gross, Lansdale, Pa.

[73] Assignee: Greene, Tweed & Co., Inc., North Wales, Pa.

[21] Appl. No.: 53,883

[22] Filed: Jul. 2, 1979

[51] Int. Cl.³ .............................................. F16J 15/00
[52] U.S. Cl. ................................ 277/188 R; 277/177
[58] Field of Search ............... 277/188 R, 188 A, 177, 277/165, 190, 176

[56] References Cited
U.S. PATENT DOCUMENTS

| | | | |
|---|---|---|---|
| 3,218,087 | 11/1965 | Hallesy | 277/188 R |
| 3,582,094 | 6/1971 | Whittaker | 277/188 R |
| 3,693,786 | 9/1972 | Lambie | 277/188 R |

Primary Examiner—Robert I. Smith
Attorney, Agent, or Firm—Seidel, Gonda, Goldhammer & Panitch

[57] ABSTRACT

A sealing ring firmly grips a movable piston, performs the normal sealing function, and when pressure is released on the piston the sealing ring pulls back on the piston so as to retract the piston. The sealing ring is designed so as to fit in a conventional seal or "O" ring groove without any modification of the groove.

4 Claims, 5 Drawing Figures

SPRING SEAL

BACKGROUND

In devices such as disk brakes, a lining is moved into contact with the brake disk by way of a piston. It is conventional to provide a spring for returning the piston to its original position. Under a number of circumstances, the springs do not perform their intended function whereby the linings frictionally contact the brake disc even when no pressure is applied to the pistons.

The present invention solves that problem by providing a sealing ring which retracts the piston for a predetermined distance which is sufficient to prevent the linings from remaining in contact with the brake disk. For relevant prior art, see U.S. Pat. No. 4,058,084 wherein the groove for the sealing ring is non-conventional and/or a spring is provided in the groove with the sealing ring. The sealing ring of the present invention is designed to be used in a standard groove with the sealing ring performing the added function of acting like a return spring. Also see U.S. Pat. No. 3,771,801 wherein the seal disclosed therein bears a superficial resemblance to the seal of the present invention.

SUMMARY OF THE INVENTION

In accordance with the present invention, a seal assembly is provided and comprises an annular sealing ring of resilient deformable plastic material and a mating back-up ring. The sealing ring has a radially disposed side face which defines the pressure side of the assembly. The sealing ring has an inner peripheral surface defined by three discrete portions. The first portion converges toward said side face with a taper at an angle of between 3° and 10° with respect to the axis of the sealing ring. The second portion is contiguous with the first portion and is an angled surface between 20° and 40° with respect to a radius of the sealing ring. The third portion is contiguous to the second portion and is an axially extending flange adjacent the outer periphery of the sealing ring. The back-up ring is disposed radially inwardly of the third portion and has radially disposed side faces.

It is an object of the present invention to provide a novel seal assembly wherein a sealing ring performs a dual function of acting as a seal and acting as a return spring.

It is another object of the present invention to provide a novel seal assembly for use in a stationary portion of a device and capable of retracting a piston for a short distance when pressure on the piston is released, with the assembly being adapted for use in a conventional seal groove.

It is another object of the present invention to provide a seal assembly which solves a problem in connection with dragging brakes in a manner which is simple, inexpensive and reliable.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
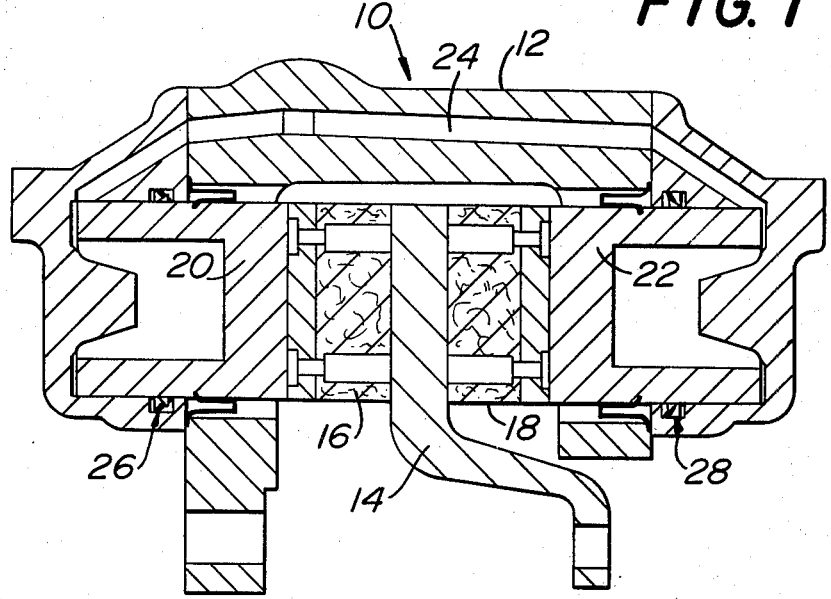
FIG. 1 is a sectional view through a typical brake assembly in which the present invention may be incorporated.

Referring to the drawings in detail, wherein like numerals indicate like elements, there is shown in FIG. 1 a disk brake representing a typical environment in which the seal assembly of the present invention may be incorporated. The brake 10 is conventional and per se forms no part of the present invention.

The brake 10 includes a housing 12 having a disk 14 between a pair of linings 16 and 18. Lining 16 abuts piston 20. Lining 18 abuts piston 22. Each piston may have a retraction spring coaxial therewith for retracting the pistons and their associated linings in the absence of pressure but such springs are unnecessary.

Fluid pressure may be applied to the lefthand end of piston 20 and the righthand end of piston 22 by way of fluid passage 24 in the housing 12. A seal assembly 26 is provided in a stationary portion of the housing 12 for sealing contact with the outer periphery of piston 20. A similar seal assembly is provided for piston 22. The seal assemblies 26 and 28 are identical. Hence, only seal assembly 28 will be described in detail.

Figure 2:
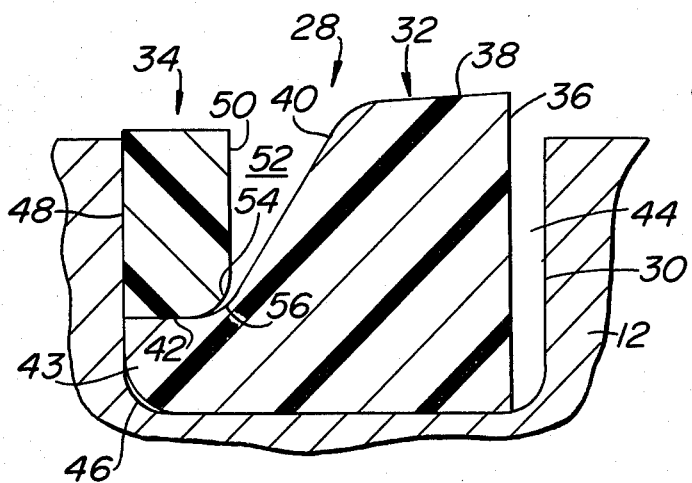
FIG. 2 is an enlarged detail view showing the seal assembly in section and mounted in a groove before contact between the seal assembly and piston.

Referring to FIG. 2, the housing 12 is provided with a standard seal or gland 30. Within the groove 30, there is provided the seal assembly 28 of the present invention. The seal assembly 28 includes a sealing ring 32 and a back-up ring 34. Ring 32 has a radially disposed side face 36 on the pressure side. That is, surface 36 is the surface exposed to the pressure applied to the piston 22. The inner periphery of the sealing ring 32 is defined by three contiguous surfaces, namely surfaces 38, 40 and 42. Surface 38 converges toward the surface 36 at an angle of between 3° and 10° with respect to the axis of sealing ring 32. The preferred taper is 4° to 6°. We have found that a taper of less than 4° for surface 38 is undesirable since there is insufficient gripping of the piston by the sealing ring. We have found that a taper in excess of 10° is undesirable since the sealing ring is virtually locked to the piston.

The intersection of surfaces 38 and 40 is rounded as shown in FIG. 2. Surface 40 extends at an angle of between 20° and 40° with respect to a radius of the sealing ring 32. The preferred angle for surface 40 is between 28° and 32° with respect to a radius on the sealing ring 32. The surface 42 defines the inner periphery of an axially extending flange 43 on the sealing ring 32. The axial thickness of the seal assembly 28 is less than the width of the groove 30 thereby leaving a space 44 on the pressure side of the groove 30. The bottom corners of the groove 30 may be rounded if desired with a slight mismatch on a rounded corner of flange 43 to thereby leave a crescent shaped space 46.

The back-up ring 34 has radially disposed side faces 48 and 50. Assembly 28 has a triangular space 52 on its inner periphery and defined by the surface 40 and face 50. The outer peripheral corner of ring 34 contiguous with space 52 is defined by a curved surface 54. The intersection of surfaces 42 and 40 is defined by a curved surface 56. The radius of curvature for surfaces 54 and 56 is identical but the center points are offset thereby resulting in space 52 at its outer periphery having a curved tail between surfaces 54 and 56.

Figure 3:
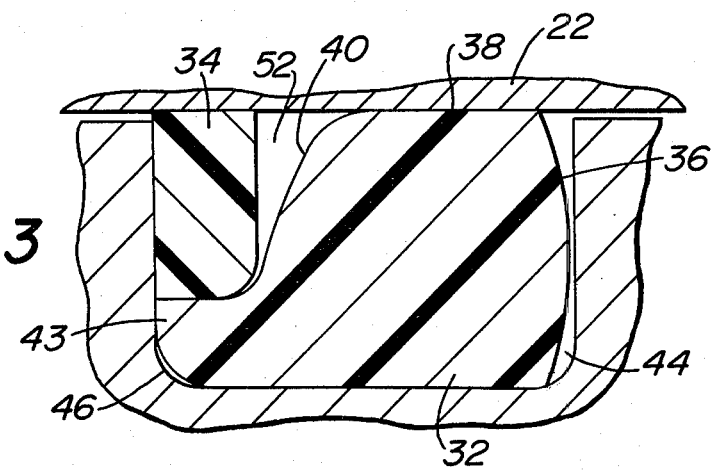
FIG. 3 is a view similar to FIG. 1 but shows the orientation of components when the inner peripheral surface of the sealing ring contacts the outer peripheral surface of a piston.

The inner diameter of sealing ring 32 is smaller than the outer diameter of the associated piston such as piston 22. When piston 22 is moved so as to be coaxial with and surrounded by the sealing ring 32, the sealing ring 32 deforms to the shape as illustrated in FIG. 3. In FIG. 3, it will be noted that the sealing ring 32 has been deformed so as to bulge surface 36 outwardly into the space 44. Also, surface 40 has been deformed so as to make the space 52 smaller but still of the same general shape. The preferred squeeze level range is 11 to 21%.

Figure 5:
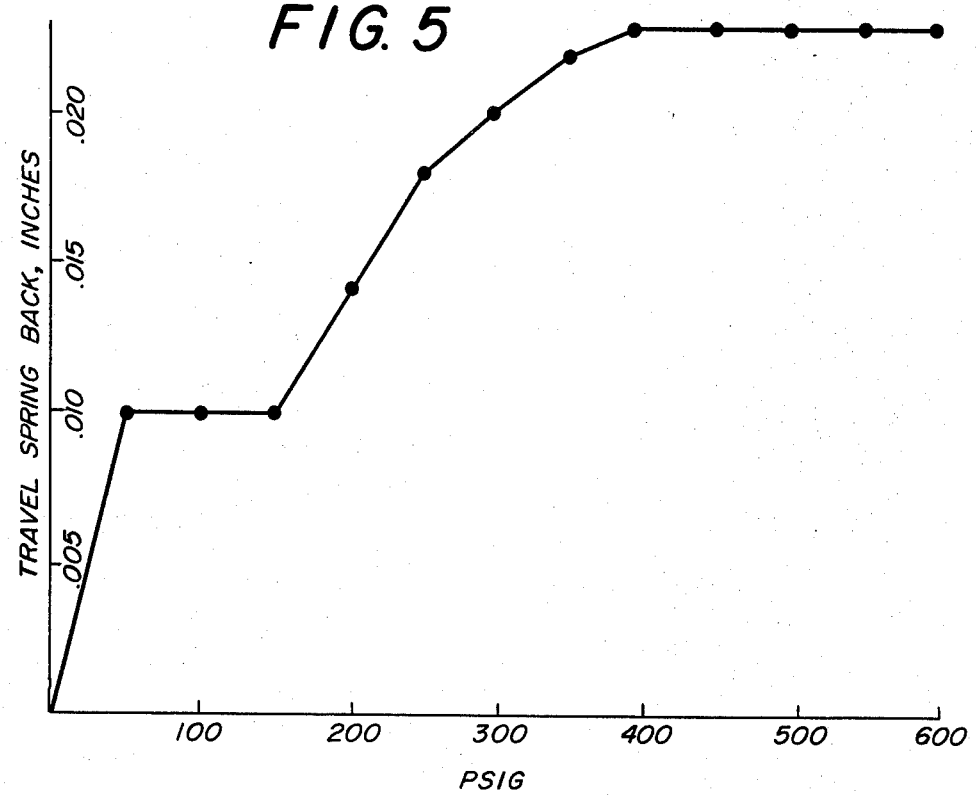
FIG. 5 is a graph showing spring back travel in inches versus pressure applied to the piston for a given size brake piston.
Figure 4:
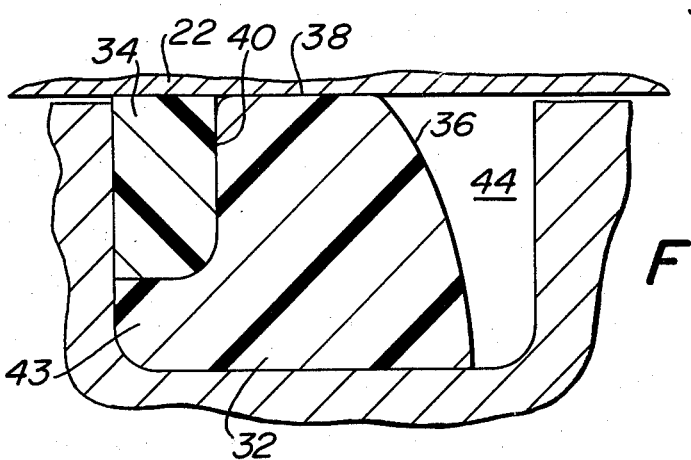
FIG. 4 is a view similar to FIG. 3 showing the orientation of the components when full pressure has been applied to the piston.

When pressure is applied to the piston 22, and it moves from right to left in FIGS. 3 and 4, the sealing ring 32 deforms to the shape shown in FIG. 4. Spaces 52 and 46 have disappeared while space 44 is substantially larger. When the pressure is released, sealing ring 32 assumes the shape as shown in FIG. 3 and retracts the piston 22 from left to right. The amount of retraction of piston 22 by the sealing ring 32 is a function of fluid pressure applied to the piston. As shown in FIG. 5, the sealing ring 32 retracts the piston 22 between 0.010 inch when the pressure is 50 pounds per square inch and 0.022 inch when the pressure is 400 pounds per square inch. Surprisingly, increasing the pressure up to 600 pounds per square inch or higher had no effect on the amount of retraction of the piston by the sealing ring 32. The above figures represent measured results for a specific seal size of a 0.220 cross-section (nominal 3/16 inch cross-section).

The preferred material for sealing 32 is a rubber material from the ethylene-propylene family for compatability with automotive brake fluids. Other resilient rubbers can be used as dictated by fluid choice or extreme temperature conditions. Of importance is the selection of a highly resilient rubber compound with minimal compression set characteristics. The back-up ring 34 is preferably made from a material sold commerically as NYLATRON which is injection molded or machined into the shape shown. The back-up ring 34 can be made of other conventional back-up materials such as TFE nylon, phenolic, metal, as the circumstance may dictate.

The space 44 should be sufficient to allow thermal expansion of the seal assembly at the maximum operating temperatures. In order to facilitate ease of assembly and to facilitate distortion of the sealing ring 32, we prefer that the space 44 have a width of 5 to 15% of the seal groove axial length.

In a preferred embodiment of the sealing ring 32, the ring had a outer nominal diameter of 3.143 inches with the radial length of surface 36 in FIG. 2 being a nominal length of 0.215 inch. When sealing ring 32 is distorted radially outwardly by the piston 22 as shown in FIG. 3, surface 36 along a radius was decreased by approximately 0.025 to 0.030 inch. Thus, the length of surface 36 along a radius decreased between about 8 to 14% due to deformation by the piston 22 when comparing FIGS. 2 and 3. We have found that a ring constructed in this manner will repetitively pull the piston back a sufficient amount so as to prevent the linings 16, 18 from contacting the disk 14 when pressure is released. A separate spring is not required and the groove 30 is a standard seal groove requiring no special machining or shape. The curved surfaces 54, 56 prevent the concentration of stress when the sealing ring 32 assumes the position shown in FIG. 4.

The back-up ring 34 must have an inner diameter which is equal to or greater than the maximum outer diameter of the piston associated therewith. The axial thickness of the back-up ring 34 with respect to the axial length of the groove 30 may between 15 and 25%. The seal assembly of the present invention may be a male or female so long as the groove containing the same is stationary.

The present invention may be embodied in other specific forms without departing from the spirit or essential attributes thereof and, accordingly, reference should be made to the appended claims, rather than to the foregoing specification, as indicating the scope of the invention.

We claim:
1. A seal assembly comprising:
   (a) an annular sealing ring of resilient deformable plastic material and a mating back-up ring,
   (b) said sealing ring having a radially disposed side face defining the pressure side of the assembly, said sealing ring having its inner peripheral surface defined by three contiguous portions, the first portion converging toward said side face with a taper of between 3° and 10° with respect to the axis of the sealing ring, the second portion being an angled surface extending outwardly from said first portion at an angle of between 20° and 40° with respect to a radius on said sealing ring, said third portion being an axially extending flange adjacent the outer periphery of said sealing ring,
   (c) said back-up ring being disposed radially inwardly of said third portion and having radially disposed side faces, one side face of said back-up ring cooperating with said second portion to define a generally triangular shaped space on the inner periphery of said assembly with the apex of the triangular shaped space extending radially outwardly.

2. A seal assembly in accordance with claim 1 wherein the intersection of said second and third portions is defined by a curved surface, and a juxtaposed corner of said back-up having a similar curved surface.

3. A seal assembly in accordance with claim 1 wherein the inner diameter of the sealing ring in an unstressed condition is smaller than the inner diameter of said back-up ring.

4. A seal assembly in accordance with claim 1 including a stationary housing portion containing an annular groove, said assembly being disposed within said groove, the axial length of said groove being greater than the axial length of said assembly so as to define an unoccupied space contiguous with said side face of the sealing ring, and a piston within said assembly, said piston deforming the inner periphery of said sealing ring so as to bulge said side face into said last-mentioned space and place the sealing ring in compression due to contact between said first portion of the sealing ring and the outer peripheral surface of said piston, whereby said sealing ring grips the piston and can retract the piston when pressure is removed from the piston.

* * * * *